(12) United States Patent
Kottekulam Vasu et al.

(10) Patent No.: US 11,256,826 B2
(45) Date of Patent: Feb. 22, 2022

(54) METHOD AND SYSTEM FOR GENERATING CONSENT RECOMMENDATION

(71) Applicant: Tata Consultancy Services Limited, Mumbai (IN)

(72) Inventors: Rosni Kottekulam Vasu, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 423 days.

(21) Appl. No.: 16/351,346

(22) Filed: Mar. 12, 2019

(65) Prior Publication Data

US 2020/0134228 A1 Apr. 30, 2020

(30) Foreign Application Priority Data

Oct. 26, 2018 (IN) .............................. 201821040563

(51) Int. Cl.
  *G06F 21/62* (2013.01)
  *G06N 20/00* (2019.01)
  *H04L 29/08* (2006.01)
  *G06F 3/01* (2006.01)
  *H04L 67/306* (2022.01)

(52) U.S. Cl.
  CPC .......... *G06F 21/6245* (2013.01); *G06F 3/011* (2013.01); *G06N 20/00* (2019.01); *H04L 67/306* (2013.01)

(58) Field of Classification Search
  CPC ... G06F 21/6245; H04L 67/306; H04L 41/22; H04L 43/045
  See application file for complete search history.

(56) References Cited

U.S. PATENT DOCUMENTS

| | | | |
|---|---|---|---|
| 2006/0026042 A1 | 2/2006 | Awaraji et al. | |
| 2006/0259483 A1* | 11/2006 | Ozana | G06F 40/174 |
| 2012/0133515 A1* | 5/2012 | Palshof | G08B 21/06 340/575 |
| 2017/0032143 A1* | 2/2017 | Kong | G06F 21/6245 |

FOREIGN PATENT DOCUMENTS

WO  WO-2001/033936  5/2001

\* cited by examiner

*Primary Examiner* — Nhat Huy T Nguyen
(74) *Attorney, Agent, or Firm* — Finnegan, Henderson, Farabow, Garrett & Dunner LLP

(57) ABSTRACT

This disclosure relates generally to consent management, and more particularly to a method and system for generating consent recommendation. The system determines a user aspect indicating consent preferences of the user, and identifies/predicts a reference privacy profile as matching the user aspect. The system uses a machine learning model to process the user aspect and to predict the matching reference privacy profile. Further, based on the matching reference privacy profile, the system generates one or more consent recommendations. The system can also be configured to obtain feedback for the generated consent recommendations and re-recommends consents based on the obtained feedback.

15 Claims, 4 Drawing Sheets

METHOD AND SYSTEM FOR GENERATING CONSENT RECOMMENDATION

PRIORITY CLAIM

This U.S. patent application claims priority under 35 U.S.C. § 119 to: India Application No. 201821040563, filed on 2018 Oct. 26. The entire contents of the aforementioned application are incorporated herein by reference.

TECHNICAL FIELD

This disclosure relates generally to consent management, and more particularly to a method and a system for generating consent recommendations for a user.

BACKGROUND

In various circumstances, a data subject (who may be a user of an application, a website, and so on) may be required to share personal information. The personal information may be personally identifiable information (PII) or sensitive personal information (SPI) such as but not limited to name, age, sex, date of birth, or may be user ID, credit/debit card numbers, and national identification number, or may be bank account information and so on. With strict data privacy rules in place, websites or applications or any such platforms that access user data requires user consent before accessing and using the user data.

The inventors here have recognized several technical problems with such conventional systems, as explained below. Most of the systems/platforms that are accessing such data are configured to obtain user consent before and/or while accessing and using such data. However for a user who interacts with multiple such platforms, it may be an inconvenience (in terms of time, and effort) to provide consent every time (or at least when the user accesses the platform for the first time) the platform is accessed.

SUMMARY

Embodiments of the present disclosure present technological improvements as solutions to one or more of the above-mentioned technical problems recognized by the inventors in conventional systems. For example, in one embodiment, a processor-implemented method for consent recommendation is provided. Initially, a user aspect indicating consent preferences of a user is determined, via one or more hardware processors. Further, a matching privacy profile from a plurality of privacy profiles is identified, corresponding to the determined user aspect. Further, at least one consent recommendation is generated based on the matching privacy profile, via the one or more hardware processors.

In another embodiment, a system for consent recommendation is provided. The system includes one or more communication interfaces; a memory module storing a plurality of instructions; and one or more hardware processors coupled to the memory module via the one or more communication interfaces. The one or more hardware processors are configured by the instructions to initially determine a user aspect indicating consent preferences of a user. Further the system identifies a matching privacy profile from a plurality of privacy profiles, corresponding to the determined user aspect. Further, at least one consent recommendation is generated based on the matching privacy profile.

In yet another embodiment, a non-transitory computer readable medium for consent recommendation is provided. Initially, user aspect indicating consent preference of a user is determined, via one or more hardware processors. Further a matching privacy profile from a plurality of privacy profiles, corresponding to the collected user response, is identified. Further, at least one consent recommendation is generated based on the matching privacy profile.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
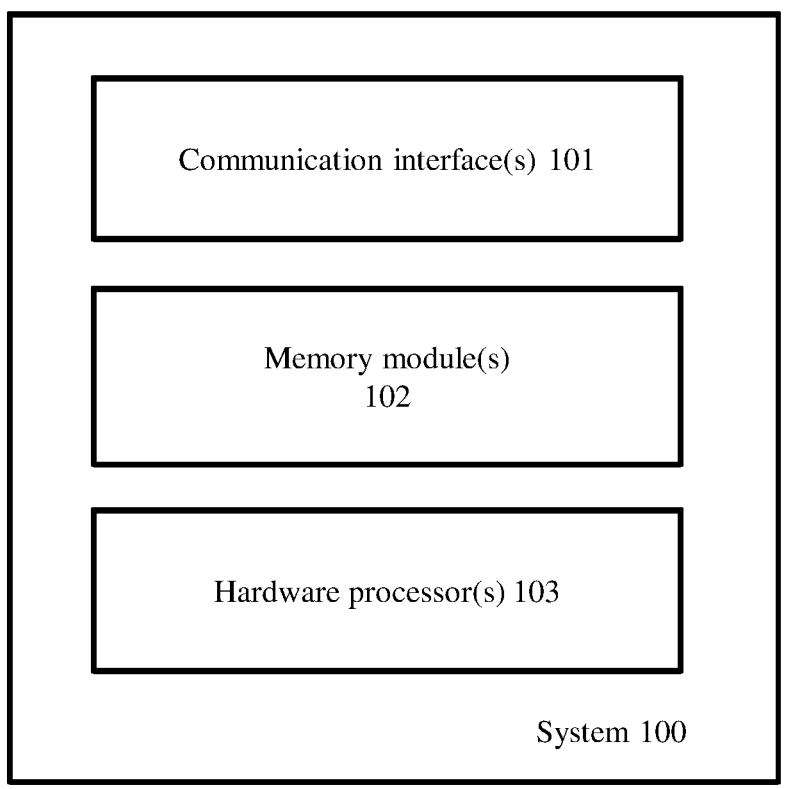
FIG. 1 illustrates an exemplary system for generating consent recommendations, according to some embodiments of the present disclosure.

FIG. 1 illustrates an exemplary system 100 for generating consent recommendations, according to some embodiments of the present disclosure. The system 100 includes one or more memory modules 102, one or more hardware processors 103, and one or more communication interfaces 101. The memory module(s) 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory module 102.

The one or more hardware processors 103 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 101 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

In each platform (wherein the term 'platform' may refer to a website, a mobile application and so on), the fields may vary. For example, if the platform is a video calling application installed on a mobile phone, the application may request access to camera, microphone, contact list and so on. Similarly if the application is an online trading website, it may request for access to data such as but not limited to personal details of the user, and bank/dematerialized account details and so on. It is to be noted that the 'platform' is also referred to as an 'entity', and the terms platform and entity are used interchangeably throughout the specification and claims. Further, each of such fields may have one or more characteristics defined in terms of title, description, category, linked enterprises, and so on. Further, each field may have specific 'purpose'. For example, the field may be 'email address' and the purpose maybe 'marketing'. It means that an enterprise requires user consent to use email address of the user for marketing purpose. The enterprise may give the title of the purpose, proper description of using that data field for given purpose, category of purpose, duration/retention period of purpose and the data fields used for that purpose and so on. Data pertaining to end users and set of enterprises they are linked to, also is collected. Further, for each entity, data such as but not limited to the fields, the purpose of each field, and the data pertaining to end users and set of enterprises they are linked to, are used to generate a knowledge base (which is entity specific). In an embodiment, every time a new purpose is introduced or an existing purpose is updated, the system 100 checks for a similar purpose based on at least the following attributes:

1. Purpose category: Categories used for filtering the purposes

2. Risk values: Risk values of the filtered purposes are compared with risk values of the new/updated purposes to identify a closest matching purpose.

Further, using consent values of the matched purpose in each of the reference privacy profiles, the new/updated purpose if accommodated in all the reference privacy profiles.

Further, for all or selected purposes from each knowledge base, the system 100 collects user consent information using an appropriate mechanism. For example, user consent information may be collected as response to a survey conducted. For example, the user consent may be, but not limited to 'allow' or 'deny', and any such user consents may be defined and configured with the system 100, as per requirements. Response time of a user to each consent request generated as part of the survey also may be recorded by the system 100.

The system 100 is configured to initially generate and store multiple reference privacy profiles, by collecting and processing information from the knowledge base of each entity. At this stage, in one embodiment, the system 100 performs a risk computation to assess risk associated with data exposure at different fields. For risk computation, the system 100 takes purpose related information from the knowledge database. Further, the system 100 identifies risk value of each purpose based on parameters such as but not limited to sensitivity level of personal information exposed at each field, reputation level of enterprise which owns the platform, and duration of purpose (i.e. duration of data exposure at corresponding field), as given below:

a. Directly proportional to the sensitivity of personal information processed in a purpose. Higher the sensitivity, higher is the impact factor if it is misused or leaked.
  i. This is inferred from the sensitivity level of each field attached to the purpose by taking a maximum value of all such levels. In addition, if a combination of fields exists for which the field group sensitive is higher, this is considered in calculating the sensitivity of attached personal information.
b. Indirectly proportional to the reputation of the enterprise. Higher the reputation, lesser is the chance of sensitive information getting misused or leaked.
c. Directly proportional to the duration of purpose. Keeping the sensitive information for longer time shall amplify the chance of it being misused or leaked.
d. Directly proportional to the existence of quasi-identifier in set of the sensitive information present in the purposes for which positive consent (allow) is provided.

Based on the proportionality of one or more of the aforementioned parameters (such as sensitivity(s), purpose duration (t), reputation(r)), a risk value is obtained, wherein the risk value of a particular data field indicates/represents risk associated with data exposure at that data field. The risk value is a real number between 0 and 1, and may be calculated as:

$$\text{Risk} = \frac{(K)*(s*t)}{r} \quad (1)$$

where κ is a constant and normalized value of each parameter may be used for the aforementioned computation. Risk value can be computed from the above mentioned "risk" as, risk_value=f(risk) where f(•) can be a mathematical function such a sigmoid. Therefore, in that instance the risk value may obtained as:

$$\text{risk\_value} = \frac{1}{(1+e^{-risk})} \quad (2)$$

The risk value may then normalized between 0 and 1 to obtain a normalized risk value as per requirement, based on a defined function.

For example, the normalization can be computed as given below. Let a, b be a constant interval (e.g., 0.01 and 0.99). Let "$\text{value}_{norm}$" is the required normalized value of the variable "value" (value may be sensitivity(s), reputation(r), purpose duration (t) or risk value), "$value_{min}$" is the minimum value of the variable and "$value_{max}$" is the maximum value of the variable.

$$value_{norm} = a + \frac{(b-a) * value - value_{min}}{value_{max} - value_{min}} \quad (3)$$

Further, the system 100 builds/generates reference privacy profiles, wherein each of the reference privacy profiles captures data such as but not limited to purposes, and user consent for the purposes.

In an alternate embodiment, to generate the reference privacy profiles, the system 100 may use neighborhood approaches and latent factor modeling. For example, using one or more model based collaborative filtering techniques, the system 100 learns latent factors of user preferences. The latent factors attempt to explain the obvious and non-obvious dimensions (such as how much that data field important to a particular user, trust factor of the organization, duration of the purpose, user may have past bad experience with the enterprise and so on.) which influences user consents. The system 100 uses one or more clustering algorithms on these latent factors, so as to build a plurality of user clusters. Each of the plurality of user clusters contains a set of user responses (consents) for every purpose in the system 100. At this stage, the system 100 uses the risk value from aforementioned embodiment to deduce the user consent thereby build a plurality of reference privacy profiles.

In various embodiments, the user consent for each purpose may be 'allow' or 'deny' or anything similar to that, as pre-configured with the system 100. For every purpose in each reference user clusters, the aforementioned normalized risk value is used to deduce one among the available consents in order to generate the final reference privacy profiles as:

$$\text{Score(consent = allow)} = \frac{(numberofusersgiven'allow')}{numberoftotalusers} * (1 - RV) \quad (4)$$

$$\text{Score(consent = deny)} = \frac{(numberofusersgiven'deny')}{numberoftotalusers} * RV \quad (5)$$

$$\text{Consent}(Pi) = \quad (6)$$
$$\begin{cases} \text{Allow,} & \text{Score(consent = allow)} \geq \text{Score(consent = deny)} \\ \text{deny,} & \text{otherwise} \end{cases}$$

The reference privacy profiles are then stored in the memory module(s) 102.

Figure 4:
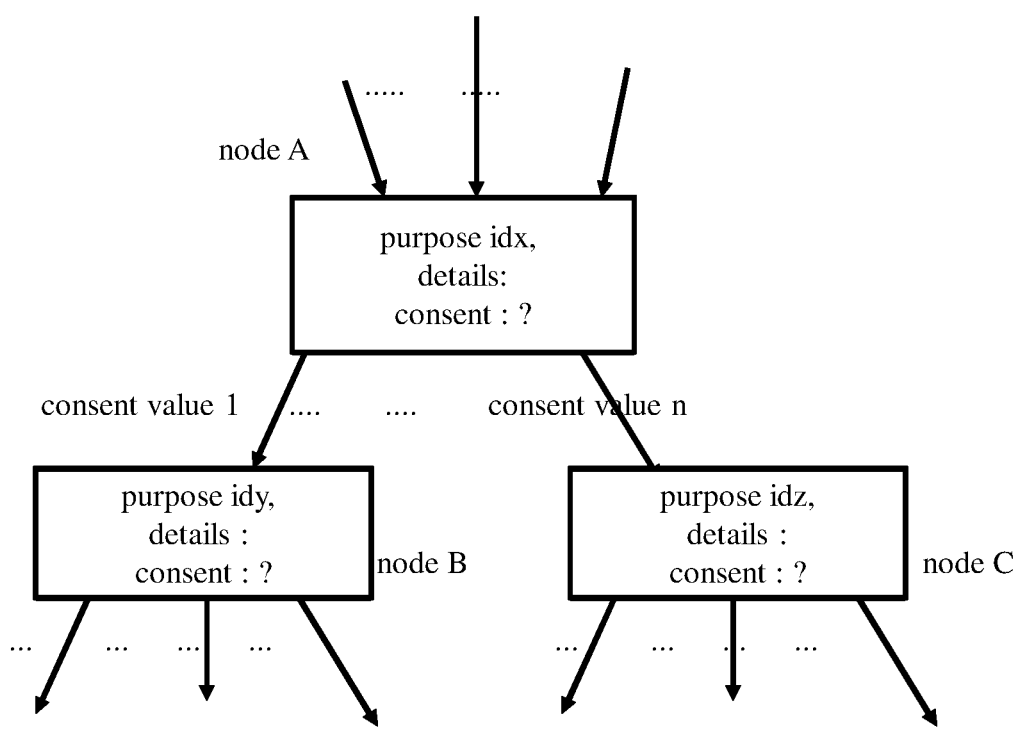
FIG. 4 is an example diagram depicting tree structure like arrangement of questions in a questionnaire, for dynamically generating questions for a user, by the system of FIG. 1, in accordance with some embodiments of the present disclosure.

Further, when a user accesses the platform, and logs in, the system 100 determines a user aspect indicating consent preferences of the user. The system 100 can be configured to determine the user aspect based on at least one of (i) a questionnaire approach, (ii) auxiliary information, (iii) data pertaining to past consent preferences of the user, and/or (iv) any other suitable approach.

a. Using Questionnaire Approach:

In this approach, a questionnaire containing a plurality of questions, is provided to the user. In an embodiment, the questionnaire is dynamically generated/filtered by the system 100. In an embodiment, while dynamically generating the questionnaire, based on response of the user to one question, the next question may change. For example, consider that the questions in the questionnaire are arranged/represented in the form of a tree, with the first question forming a root node, and from each node in the tree (as depicted in FIG. 4), multiple branches are formed each matching different consents i.e. the user response (i.e. consent) to question 1 can be either 'consent value 1' or 'consent value n'. If the user response is 'consent value 1', then a question connected with 'consent value 1' (i.e., from node B in FIG. 4) is asked as the second question. Whereas if the user response is 'consent value n', then a question connected with 'consent value n' (i.e., from node C in FIG. 4) is asked as the second question. The system 100 further collects user response to the questions.

In an embodiment, after collecting the user response to each question (or for certain number of consecutive questions), the system 100 detects a fatigue level of the user to verify whether the user is tired or not. In various embodiments, the system 100 detects the fatigue level of the user, at least in terms of response time and consistency of responses. For example, when the user is responding to questions in the questionnaire, the system 100 checks and identifies a pattern of the user response, wherein the pattern of user response contains information pertaining to time taken by the user to respond to questions along with other parameters, for each purpose. The time taken by the user to respond to different questions may vary based on parameters such as but not limited to length and wording specific to the purposes. As the response time is captured and stored at the time of conducting the initial survey, the system 100 checks for significant variations if any, and accordingly identifies whether the user is tired or not. For example, if the response time matches the response time recorded during the initial survey, then the system 100 understands that the user is not tired. However if the response time is significantly (may be defined in terms of a threshold value) higher, then that may be an indication of fatigue. Also, at least to reconfirm that the user is tired, the system 100 may ask one or more questions from the questionnaire which had been asked earlier, and collects the user response. If the user response to the questions (when asked again) is different from the previously captured response for the same questions, it may indicate that the user is not paying attention while answering the questions, and may in turn indicate that the user is tired. The fatigue level of the user may be calculated and represented by the system 100, in the form of a fatigue parameter (f), wherein the fatigue parameter may indicate/represent number of questions after which the user loses focus due to fatigue. If the user is identified as tired, then the system 100 may trigger at least one precautionary action. The precautionary action may be terminating or postponing the current session, so that the user gets sufficient time to recover. If the session is being postponed, then the time for which the session is being postponed to may be automatically suggested by the system 100, or may be manually decided by the user. In another embodiment, upon identifying that the user is tired after responding to certain number (say, 'x') of questions, the system 100 may check whether the responses already obtained (i.e. for the x number of questions) is sufficient to determine the user aspect, and if found to be sufficient, may not postpone the session even though only partial response has been obtained. In another embodiment, the system 100 may process this 'partial response' along with the auxiliary information and/or past user preference information, so as to determine the user aspect.

b. Using Auxiliary Information:

For various reasons, the user may not be ready to provide response to the questions in the questionnaire. The system 100 may provide the questionnaire based approach as an option for the users. If the user chooses not to respond to the questions in the questionnaire, then the system 100 may use auxiliary information to determine the user aspect. The auxiliary information may include, but not limited to, demographic information pertaining to the user, and information pertaining to business the user belongs to. One or more of the auxiliary information when taken one at a time or in combination, represents the user aspect. For example, if the user belongs to business unit 'A' and from location 'B', they system 100 may possess reference data in at least one of the reference databases which indicates a user aspect that matches only 'A', only 'B', or a combination of 'A' and 'B'. Based on this data, the system 100 identifies the user aspect.

c. Based on Past User Preferences:

The system 100 may possess data pertaining to consent preferences of the user over a period of time. For example, if the system 100 has data which indicates that the user had been giving a particular consent (for example, 'allow') for a particular consent request or for a particular type of consent requests, then using this data as reference, the system 100 can determine the user aspect. In an embodiment, the system 100 collects history information i.e., information pertaining to consent preferences of the user over a period of time, from one or more external systems, through appropriate interface(s). In another embodiment, the system 100 provide appropriate user interfaces for any authorized user to configure the history information (and any other required data) with the system 100.

The system 100 then processes the collected user aspect(s). At this stage, the system 100 provides the collected user aspect(s) as input to at least one machine learning data model, which is pre-trained and configured with the system 100. In an embodiment, the machine learning data model is stored in at least one database in one or more of the memory modules 102. The system 100 trains the machine learning model, using one or more appropriate machine learning algorithms such as but not limited to decision tree and support vector machine. The system 100 uses data such as but not limited to user consents (based on the user aspects), and determined/pre-computed reference privacy profiles from the knowledge base of the system 100, so as to train the machine learning model (which is a prediction model). Using the machine learning model, the system 100 processes the user aspect, and predicts one of the reference privacy profiles as a matching reference privacy profile (i.e., which matches with the user aspect).

The system 100 then uses the matching reference privacy profile for generating at least one consent recommendation. For example, from the existing knowledge base, each training instance may be of the form (x, y). x is feature vector to represent the user preference and other attributes. x may be converted as a vector of real numbers (e.g., x= [0.1,0.8,0.3, . . . 0.2]) or boolean values {0,1}. y is a target label here, wherein y$\varepsilon$ {profile_1, profile_2, . . . , profile_n}. The system 100 converts the collected user aspect into the vector format with equal dimensions (e.g, [0,1,1] is of dimension 3) as x. Consider x_new as the converted input, y_predict will be the identified/predicted reference profile value given x_new as input to the aforementioned machine learning model. If y_predict indicates the reference privacy profile as profile_1, the system 100 then generates at least one consent recommendation based on the predicted profile for the user.

Once the consent recommendations are provided to the user, the user may or may not agree to the consent recommendations. The system 100 checks for deviations from the recommendations by comparing consent given by the user with the recommendations made by the system 100. If deviations are detected (i.e. if the user provides a consent not recommended by the system 100), the system 100 may generate alternate recommendations (re-recommendations). If the user continues to deviate from the recommendations even after a certain number of recommendations are provided by the system 100, then the system 100 may request the user to provide reasoning behind the deviation, and may use the reasoning provided by the user to update the reference privacy profile(s) and/or the data model being used to predict the matching reference privacy profile, which in turn allows fine-tuning of the results (i.e., the consent recommendations). The system 100 may generate consistency values which may represent accuracy of the recommendations made, in light of the deviations made by the user. For example, the consistency value may be calculated by the system 100 as:

$$consistency value = \frac{user approved consent recommendations}{total consent recommendations generated by the system} \quad (7)$$

The system 100 may also use a reward mechanism so as to encourage the users to opt for giving consent. As part of the reward mechanism, the system 100 assigns reward values to various factors such as but not limited to business values, duration for which consent "allow" is given by user, inclination of the users with respect to consents (in terms of how many people have chosen "allow" or "deny" for given purpose), and constraints such as total reward points budget. Points are calculated with a goal of maximizing overall business value with as minimum reward points as possible under the constraints of budget.

The system 100 may also host an evaluation model which evaluates effectiveness and impact of the consent generation in reducing efforts of the end user.

The system 100 can be further configured to perform a risk modeling based on user consent values obtained for each purpose and the fields. A weight of data fields and purposes are derived from the collected consent values and its strength. Here, the strength of the data field for which the user consent is either 'allow' or 'deny' may be calculated as:

$$\text{Strength} = \frac{x}{x+y} \quad (8)$$

Where,

'x' is number of 'deny' obtained from the users for the data field and 'y' is number of 'allow' obtained from the users for the data field For example, the collected information may indicate that there are some data fields which consistently get strong preference (e.g., deny). This insight leads to a higher weight to that field in the risk model. The risk model helps in the analysis of the trends and ongoing preferences of the population with respect to different dimensions such as data fields, and purposes, within and across organizations.

The system 100 can be further configured to analyze reputation of different organizations which own the platforms for which the consent recommendations are being generated by the system 100. The system 100 checks feedback data obtained from the user's response to the generated recommendation and assesses degree of consistency with which the user provide a particular consent value each time he/she are prompted to do so with respect to organization, it's type, purpose category and data fields. For example, most of the time the data subject X is allowing the Bank X to use their transaction details for personalization. But when Bank Z was asking for the same, data subject denied. The system 100, by considering the context, may suggest the user 'allow' the Bank Z to process the transaction information. But the user did not agree with the recommendation. In that case, the system 100 understands that the organization's reputation or trust factor or something else is influencing the consent of the user. The acceptance and rejection ratio of consent request learned over a period of time contribute to the reputation of an organization. This ratio may be further used by the system 100 as an input to re-recommend the preferences by cutting across the user's built-in profile for the organization with low rating. This ratio may contribute to the reward mechanism as well.

Figure 2:
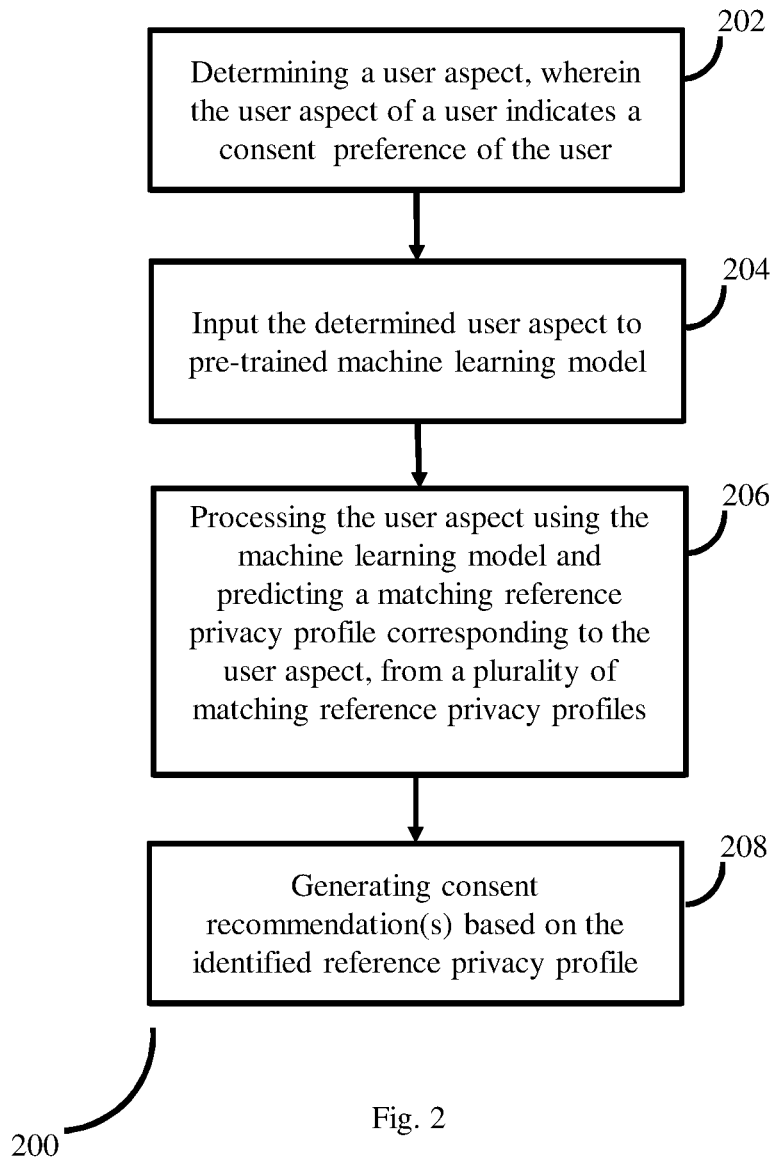
FIG. 2 is a flow diagram depicting steps involved in the process for consent recommendations, using the system of FIG. 1, according to some embodiments of the present disclosure.

FIG. 2 is a flow diagram depicting steps involved in the process of consent recommendations, using the system of FIG. 1, according to some embodiments of the present disclosure. The method involves determining (202) a user aspect that indicates consent preference of a user for whom the system 100 is generating the consent recommendations. The system 100 provides the determined user aspect as input (204) to a machine learning model. The machine learning model processes (206) the user aspect, and predicts one of the reference privacy profiles as matching the user's consent preferences as indicated by the determined user aspect (i.e., matching reference privacy profile). Further, based on the identified reference privacy profile, the system 100 generates (208) one or more consent recommendations. In various embodiments, one or more steps in method 200 may be performed in the same order as depicted or in any alternate order. In another embodiment, one or more steps in method 200 may be omitted.

Figure 3:
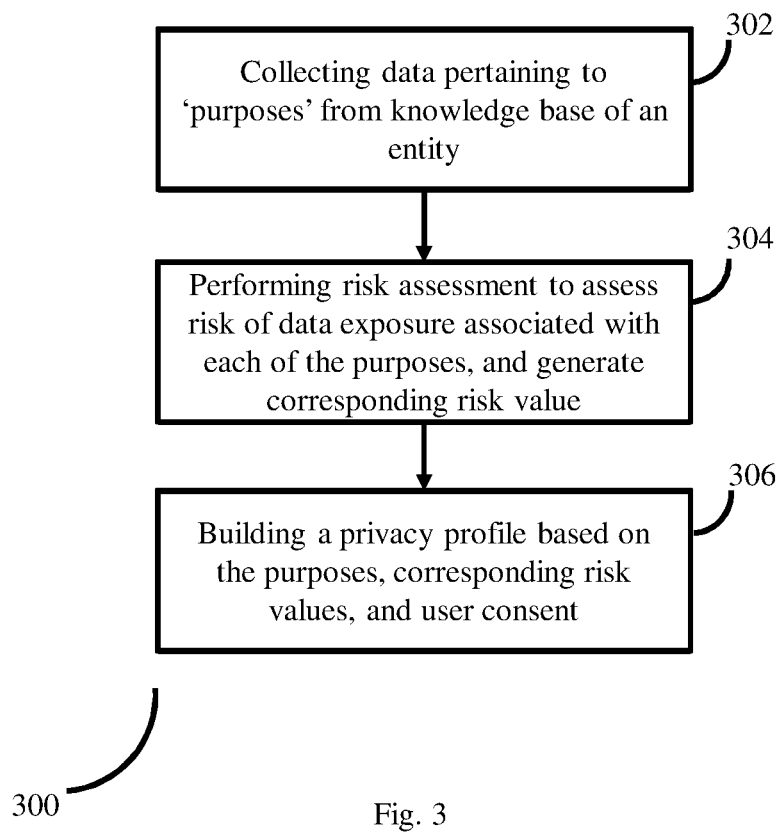
FIG. 3 illustrates a flow diagram depicting steps involved in the process of identifying a matching reference profile, using a machine learning model, by the system of FIG. 1, in accordance with some embodiments of the present disclosure.

FIG. 3 illustrates a flow diagram depicting steps involved in the process of generating reference privacy profiles, using the system of FIG. 1, in accordance with some embodiments of the present disclosure. The system 100 collects information pertaining to 'purposes' from a knowledge base of an entity. The system 100 also fetches data pertaining to user consent given for the purposes, which is collected based on an initial survey conducted. The system 100 then performs a risk assessment to assess risk of data exposure with each purpose, and in turn generates a corresponding risk value. The system 100 then builds (308) one or more privacy profiles, wherein each privacy profile contains data such as the purposes, corresponding user consent, and the assessed risk values. Details of steps in method 300 are covered in description of FIG. 1. In various embodiments, one or more steps in method 300 may be performed in the same order as depicted or in any alternate order. In another embodiment, one or more steps in method 300 may be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for consent recommendation, comprising:

determining a user aspect indicating consent preference of a user, via one or more hardware processors;

identifying, via the one or more hardware processors, a matching reference privacy profile out of a plurality of reference privacy profiles, corresponding to the determined user aspect;

generating at least one consent recommendation based on the matching privacy profile, via the one or more hardware processors, wherein the plurality of reference privacy profiles are used for collecting and processing information corresponding to the determined user aspect, and wherein the processing information is stored in a knowledge database, wherein the user aspect indicating the consent preference of the user is identified based on at least one of (i) collected user response to a plurality of questions in a questionnaire, (ii) at least one auxiliary information pertaining to the user, or (iii) data pertaining to past consent preferences of the user, and checking for deviations from the at least one consent recommendation by comparing the consent preference of the user with one or more consent recommendations, wherein if the deviations are detected, alternate recommendations are generated and wherein if the user continues to deviate from the one or more consent recommendations after a certain number of the one or more consent recommendations, then a reasoning for the deviation is required and based on the reasoning an updated reference privacy profile is generated, the updated reference privacy profile is used to predict the matching reference privacy profile; and applying a latent factor modelling approach to generate the plurality of reference privacy profiles related to the consent recommendation, wherein a fatigue level of the user responding to the questionnaire is detected, and wherein when the detected fatigue level of the user exceeds a threshold of fatigue level, a precautionary action is triggered, wherein the precautionary action is at least one of terminating and postponing a current session, and wherein if the current session is being postponed, an alternative time is automatically suggested and if the collected user responses are sufficient to determine an user aspect.

2. The processor-implemented method as claimed in claim 1, wherein each of the plurality of reference privacy profiles comprises of one or more purposes, a user consent for each of the one or more purposes, and risk value corresponding to each of the one or more purposes.

3. The processor-implemented method as claimed in claim 2, wherein each of the plurality of reference privacy profiles is generated by:
fetching data pertaining to the one or more purposes from a knowledge base of at least one entity;
performing risk computation to assess risk of each of the plurality of purposes, wherein the assessed risk is represented in terms of the risk value; and
building the reference privacy profiles based on at least a few of the plurality of purposes, corresponding risk values and the user consent.

4. The processor-implemented method as claimed in claim 2, wherein the risk value is computed for each of the one or more purposes based on (i) sensitivity level of personal information being captured for each of the one or more purposes, (ii) reputation level of an enterprise which decides each of the one or more purposes, and (iii) duration of data exposure with each of the one or more purposes.

5. The processor-implemented method as claimed in claim 1, wherein the step of identifying a matching reference privacy profile comprises:
providing the determined user aspect as input to at least one pre-trained machine learning model; and
predicting the matching reference privacy profile corresponding to the user aspect, by the at least one pre-trained machine learning model.

6. A system (100), comprising:
one or more communication interfaces (101);
a memory module (102) storing a plurality of instructions; and
one or more hardware processors (103) coupled to the memory module (102) via the one or more communication interfaces (101), wherein the one or more hardware processors (103) are configured by the instructions to:
determine a user aspect indicating consent preference of a user;
identify a matching reference privacy profile out of a plurality of reference privacy profiles, corresponding to the determined user aspect;
generate at least one consent recommendation based on the matching reference privacy profile, wherein the plurality of reference privacy profiles are used for collecting and processing information corresponding to the determined user aspect, and wherein the processing information is stored in a knowledge database, wherein the system identifies the user aspect indicating the consent preference of the user based on at least one of collected user response to a plurality of questions in a questionnaire, at least one auxiliary information pertaining to the user, or data pertaining to past consent preferences of the user, and check for deviations from the at least one consent recommendation by comparing the consent preference of the user with one or more consent recommendations, wherein if the deviations are detected, alternate recommendations are generated and wherein if the user continues to deviate from the one or more consent recommendations after a certain number of the one or more consent recommendations, then a reasoning for the deviation is required and based on the reasoning an updated reference privacy profile is generated, the updated reference privacy profile is used to predict the matching reference privacy profile; and
apply a latent factor modelling approach to generate the plurality of reference privacy profiles related to the consent recommendation, wherein the system is configured to detect a fatigue level of the user responding to the questionnaire, and wherein when the detected fatigue level of the user exceeds a threshold of fatigue level, the system triggers a precautionary action and wherein if the current session is being postponed, an alternative time is automatically suggested and if the collected user responses are sufficient to determine an user aspect.

7. The system as claimed in claim 6, wherein each of the plurality of reference privacy profiles comprises of one or more purposes, a user consent for each of the one or more purposes, and risk value corresponding to each of the one or more purposes.

8. The system as claimed in claim 7, wherein the system generates each of plurality of reference privacy profiles by:
fetching data pertaining to the one or more purposes from a knowledge base of at least one entity;
performing risk computation to assess risk of each of the one or more purposes, wherein the assessed risk is represented in terms of the risk value; and
building the privacy profiles based on at least a few of the one or more purposes, corresponding risk values and the user consent.

9. The system as claimed in claim 8, wherein the system computes the risk value for each of the one or more purposes based on (i) sensitivity level of personal information being captured for each of the one or more purposes, (ii) reputation level of enterprise which decides the one or more purposes, and (iii) duration of data exposure with each of the one or more purposes.

10. The system as claimed in claim 6, wherein the system identifies the matching reference privacy profile by:
providing the determined user aspect as input to at least one pre-trained machine learning model of the system; and
predicting the matching reference privacy profile corresponding to the user aspect, by the at least one pre-trained machine learning model.

11. A non-transitory computer readable medium for consent recommendation, said non-transitory computer readable medium comprising one or more instructions which when executed by one or more hardware processors cause:
determining a user aspect indicating consent preference of a user;
identifying a matching reference privacy profile out of a plurality of reference privacy profiles, corresponding to the determined user aspect;
generating at least one consent recommendation based on the matching privacy profile, wherein the plurality of reference privacy profiles are used for collecting and processing information corresponding to the determined user aspect, and wherein the processing information is stored in a knowledge database, wherein the user aspect indicating the consent preference of the user is identified based on at least one of (i) collected user response to a plurality of questions in a questionnaire, (ii) at least one auxiliary information pertaining to the user, or (iii) data pertaining to past consent preferences of the user, and checking for deviations from the at least one consent recommendation by comparing the consent preference of the user with one or more consent recommendations, wherein if the deviations are detected, alternate recommendations are generated and wherein if the user continues to deviate from the one or more consent recommendations after a certain number of the one or more consent recommendations, then a reasoning for the deviation is required and based on the reasoning an updated reference privacy profile is generated, the updated reference privacy profile is used to predict the matching reference privacy profile; and applying a latent factor modelling approach to generate the plurality of reference privacy profiles related to the consent recommendation, wherein a fatigue level of the user responding to the questionnaire is detected, and wherein when the detected fatigue level of the user exceeds a threshold of fatigue level, a precautionary action is triggered, and wherein the precautionary action is at least one of terminating and postponing a current session and wherein if the current session is being postponed, an alternative time is automatically suggested and if the collected user responses are sufficient to determine an user aspect.

12. The non-transitory computer readable medium as claimed in claim 11, wherein each of the plurality of reference privacy profiles comprises of one or more purposes, a user consent for each of the one or more purposes, and risk value corresponding to each of the one or more purposes.

13. The non-transitory computer readable medium as claimed in claim 12, wherein each of the plurality of reference privacy profiles is generated by:
fetching data pertaining to the one or more purposes from a knowledge base of at least one entity;
performing risk computation to assess risk of each of the plurality of purposes, wherein the assessed risk is represented in terms of the risk value; and
building the reference privacy profiles based on at least a few of the plurality of purposes, corresponding risk values and the user consent.

14. The non-transitory computer readable medium as claimed in claim 12, wherein the risk value is computed for each of the one or more purposes based on (i) sensitivity level of personal information being captured for each of the one or more purposes, (ii) reputation level of an enterprise which decides each of the one or more purposes, and (iii) duration of data exposure with each of the one or more purposes.

15. The non-transitory computer readable medium as claimed in claim 11, wherein the step of identifying a matching reference privacy profile comprises:
providing the determined user aspect as input to at least one pre-trained machine learning model; and
predicting the matching reference privacy profile corresponding to the user aspect, by the at least one pre-trained machine learning model.

* * * * *